United States Patent
Lee et al.

(10) Patent No.: US 7,450,183 B2
(45) Date of Patent: Nov. 11, 2008

(54) METHOD AND APPARATUS FOR COMPENSATING FOR LUMINANCE OF COLOR SIGNAL

(75) Inventors: Seongdeok Lee, Suwon-si (KR); Changyeong Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 842 days.

(21) Appl. No.: 10/936,545

(22) Filed: Sep. 9, 2004

(65) Prior Publication Data

US 2005/0110906 A1    May 26, 2005

(30) Foreign Application Priority Data

Nov. 20, 2003    (KR)    ........... 10-2003-0082771

(51) Int. Cl.
H04N 9/68   (2006.01)
H04N 3/24   (2006.01)
H04N 9/64   (2006.01)

(52) U.S. Cl. .............. 348/630; 348/645; 348/649; 348/703

(58) Field of Classification Search ............. 348/606, 348/607, 624, 630, 645, 649, 673, 703, 712; 345/589, 591; 382/162, 169; 358/521, 534
See application file for complete search history.

(56) References Cited

U.S. PATENT DOCUMENTS

| | | | |
|---|---|---|---|
| 5,282,021 A | 1/1994 | Bachmann et al. | 358/28 |
| 6,608,926 B1 | 8/2003 | Suwa et al. | 382/162 |
| 6,726,333 B2 * | 4/2004 | Huibers et al. | 353/84 |
| 6,741,736 B1 * | 5/2004 | Jaspers | 382/169 |
| 7,081,923 B1 * | 7/2006 | Noguchi | 348/256 |
| 2002/0141640 A1 * | 10/2002 | Kraft | 382/167 |
| 2006/0071936 A1 * | 4/2006 | Leyvi et al. | 345/589 |

FOREIGN PATENT DOCUMENTS

| | | |
|---|---|---|
| JP | 2002-44679 | 2/2002 |
| JP | 2002-335536 | 11/2002 |
| WO | WO 00/46983 | 8/2000 |
| WO | WO 02/101644 | 12/2002 |

OTHER PUBLICATIONS

Roth, S. et al., "Wide gamut, high brightness multiple primaries single panel projection displays," 2003 SID International Symposium Digest of Technical Papers, May 22, 2003, San Jose, CA, pp. 118-121.

* cited by examiner

Primary Examiner—Victor R Kostak
(74) Attorney, Agent, or Firm—Staas & Halsey LLP

(57) ABSTRACT

A method and apparatus for compensating for the luminance of a color signal. The luminance compensation method includes obtaining an allowable luminance ratio of a color signal, obtaining a luminance enhancing ratio of a color signal using the allowable luminance ratio, and compensating for the luminance of the color signal using the luminance enhancing ratio. The luminance ratio is the ratio of a luminance according to saturation when a color signal is represented by four or more multiple primary colors, to a luminance according to saturation when the color signal is represented by three colors.

30 Claims, 15 Drawing Sheets

METHOD AND APPARATUS FOR COMPENSATING FOR LUMINANCE OF COLOR SIGNAL

CROSS-REFERENCE TO RELATED APPLICATION

This application claims the priority of Korean Patent Application No. 2003-82771, filed on Nov. 20, 2003, in the Korean Intellectual Property Office, the disclosure of which is incorporated herein by reference.

BACKGROUND OF THE INVENTION

1. Field of the Invention

The present invention relates to a multi-color image display such as a display monitor or a color television, and more particularly, to a method for compensating for the luminance of a color signal, which is performed by a multi-color image display, and an apparatus for compensating for the luminance of a color signal, which is included in the multi-color image display.

2. Description of Related Art

In a multi-color image display which displays four of more primary colors, synthetic colors created by mixing three or more primary colors, for example, achromatic color series are high in luminance, while color signals of primary color series are relatively low in luminance as compared to the synthetic colors. Here, the color signal of primary color series means each primary color or color signals near to a line or an area connecting two primary colors. Especially, in a case where the number of the primary colors is more than four or four, a difference between the luminance of a color signal of primary color series and that of a synthetic color becomes greater.

FIG. 1 shows an example in which a color gamut of a multi-color image display representing four primary colors is illustrated on a two-dimensional plane using a red-color (R) axis and a green-color (G) axis.

Referring to FIG. 1, an arbitrary color signal represented by the multi-color image display has a unique coordinate within a hexahedron Org-Q3-Q1-Q4-Q5-Q6 in a color coordinate space. Generally, a three-color image display is a hexahedron in a three-dimensional space and a square in a two-dimensional space, while a multi-color image display is a heptahedron or a polyhedron with more faces than the heptahedron in the three-dimensional space and is a pentahedron or a polyhedron with more faces than the pentahedron in the two-dimensional space. Also, color signals with low saturation are distributed in the interior of the color area Org-Q1-Q4-Q5 shown in FIG. 1 and vector lengths (or, luminance magnitude or luminance amount) of the color signals within this color area Org-Q1-Q4-Q5 have specified values. Meanwhile, color signals with high saturation are distributed in the interiors of color areas Org-Q3-Q1 and Org-Q6-Q5, and vector lengths of the color signals within the color areas have values smaller than the specified values and are changed according to the saturation. That is, if two color signals have the same luminance and different saturations and at least one of the two color signals is placed in the interior of the color area Org-Q3-Q1 or Org-Q6-Q5, the two color signals are displayed differently in luminance and saturation on a four-color image display. Accordingly, deterioration of picture quality may occur due to falling-off in the relative luminance of a color signal with high saturation.

FIG. 2 is a view in which the color gamut of the multi-color image display of FIG. 1 is illustrated on a two-dimensional plane with a saturation axis and a luminance ratio axis, wherein Q1 through Q6 correspond respectively to Q1 through Q6 shown in FIG. 1.

In a saturation range of Q1-Q4-Q5 shown in FIG. 2, a constant luminance ratio is maintained, but in a saturation range of Q1-Q3 or Q5-Q6, the smaller the luminance ratio is, the higher the saturation is. This is because as the number of primary colors used in an image display increases, a light-emitting time or light-emitting area of each primary color is shorter or smaller, which deteriorates the luminance of the primary color.

Hereinafter, conventional luminance enhancing methods will be described.

One among conventional luminance enhancing methods is disclosed in U.S. Pat. No. 4,717,953 entitled "Bightness Control Circuit for a Television Receiver". This conventional luminance enhancing method increases the luminance of an image signal only by applying offset values to RGB. However, this conventional method brightens entire colors due to the use of offset values, thereby deteriorating the contrast of an image.

Another one among the conventional luminance enhancing methods is a method using a gamma function disclosed at Internet address http://www.inforamp.net/Npoynton/GammaFAQ.html. According to this conventional luminance enhancing method, a gamma function can be applied only to a luminance component Y as in a broadcast standard or can be applied to each of components of RGB. In a case of the former, a RGB signal is divided into a luminance signal Y and two color difference signals (Cb and Cr) or (I and Q), a gamma function is applied to the luminance signal Y to increase the luminance, and then the result is converted to an RGB signal. However, since this conventional luminance enhancing method performs color enhancing on entire color areas, a luminance difference between a color with high saturation and a color with low saturation exists.

Still another one among the conventional luminance enhancing methods is a method using a histogram equalization disclosed in the title of "Digital Image Processing" by W. K. Pratt, published in Wiley's publishing company, in 1978, and in the title of "Digital Image Processing" by R. C. Gonzalez and R. E. Woods, published in Addition-Wesley's publishing company located in Massachusetts, in 1993. The above-mentioned conventional luminance enhancing methods increase the luminance and contrast throughout all ranges of pixel values in an image. As such, since the conventional luminance enhancing methods perform luminance enhancing on entire color areas, a luminance difference between a color with high saturation and a color with low saturation still exists.

As described above, since a luminance difference according to saturations still exists in the conventional luminance enhancing methods, in particular, a color with higher saturation is smaller in the amount of luminance increase compared to a color with lower saturation, deterioration of picture quality may occur when colors are reproduced in an image display.

BRIEF SUMMARY

An embodiment of the present invention provides a method for compensating for the luminance of a color signal, capable of enhancing the luminance value of an arbitrary color signal placed in a color gamut or coordinator created by multiple colors according to the saturation of the corresponding color signal, in a multi-color image display.

Another embodiment of the present invention provides an apparatus for compensating for the luminance value of a color signal, capable of enhancing the luminance value of a color signal placed in a specific color area or coordinate according to the saturation of the corresponding color signal.

According to an aspect of the present invention, there is provided a color signal luminance compensation method including: obtaining an allowable luminance ratio of a color signal; obtaining a luminance enhancing ratio of the color signal using the allowable luminance ratio; and compensating for the luminance of the color signal using the luminance enhancing ratio, wherein the luminance ratio is a luminance ratio to saturation when a color signal is represented by more multiple primary colors than four, compared to a luminance ratio to saturation when the color signal is represented by three colors.

According to another aspect of the present invention, there is provided a color signal luminance compensation apparatus including: an allowable luminance ratio calculator which calculates an allowable luminance ratio of a color signal; a luminance enhancing ratio calculator which calculates a luminance enhancing ratio of the color signal from the allowable luminance ratio; and a luminance compensator which compensates for a luminance of the color signal using the luminance enhancing ratio, wherein the luminance ratio is a luminance ratio to saturation when the color signal is represented by more multiple primary colors than four, compared to a luminance ratio to saturation when the color signal is represented by three colors.

According to another embodiment of the present invention, there is provided a method of improving a luminance of a color signal with a low or a middle intensity level, including: determining a saturation of the color signal; and increasing or decreasing a luminance of the color signal in proportion to the saturation of the color signal.

According to still another embodiment of the present invention, there is provided a method of reducing a luminance difference between a signal with a high saturation and a signal with a low saturation, including: determining whether a difference between an allowable luminance ratio of a color signal and a specified value exists; and adjusting, when the determining determines that a difference exists, a luminance enhancing ratio of the color signal according to one of a saturation value of the color signal, the difference between the allowable luminance ratio and the specified value, and the result of dividing the allowable luminance ratio by the specified value Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
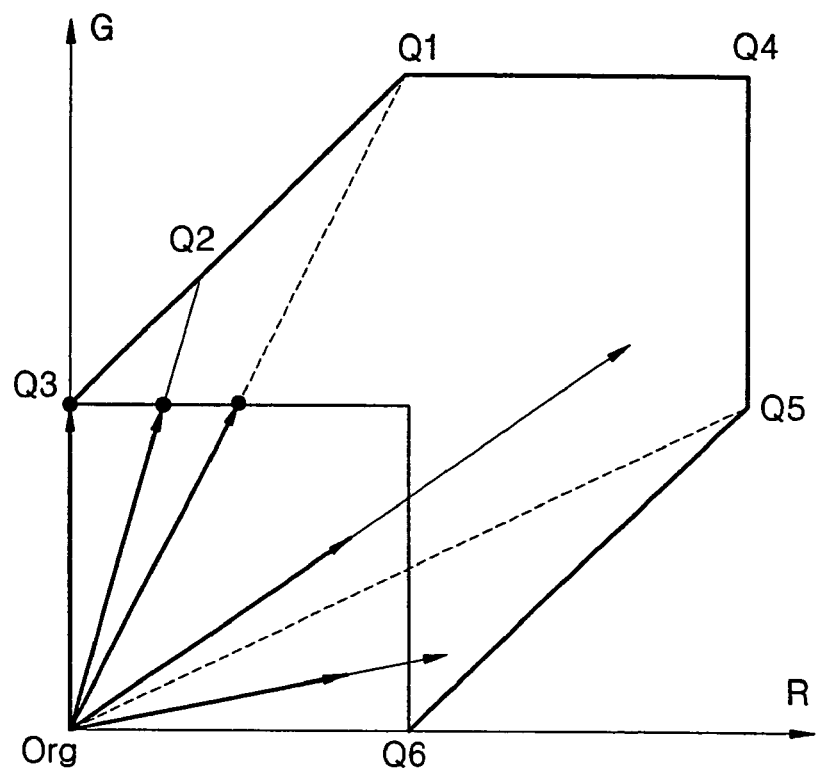
FIG. 1 is an example in which a color gamut of a multi-color image display representing four primary colors is illustrated on a two-dimensional plane using a red-color (R) axis and a green-color (G) axis.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
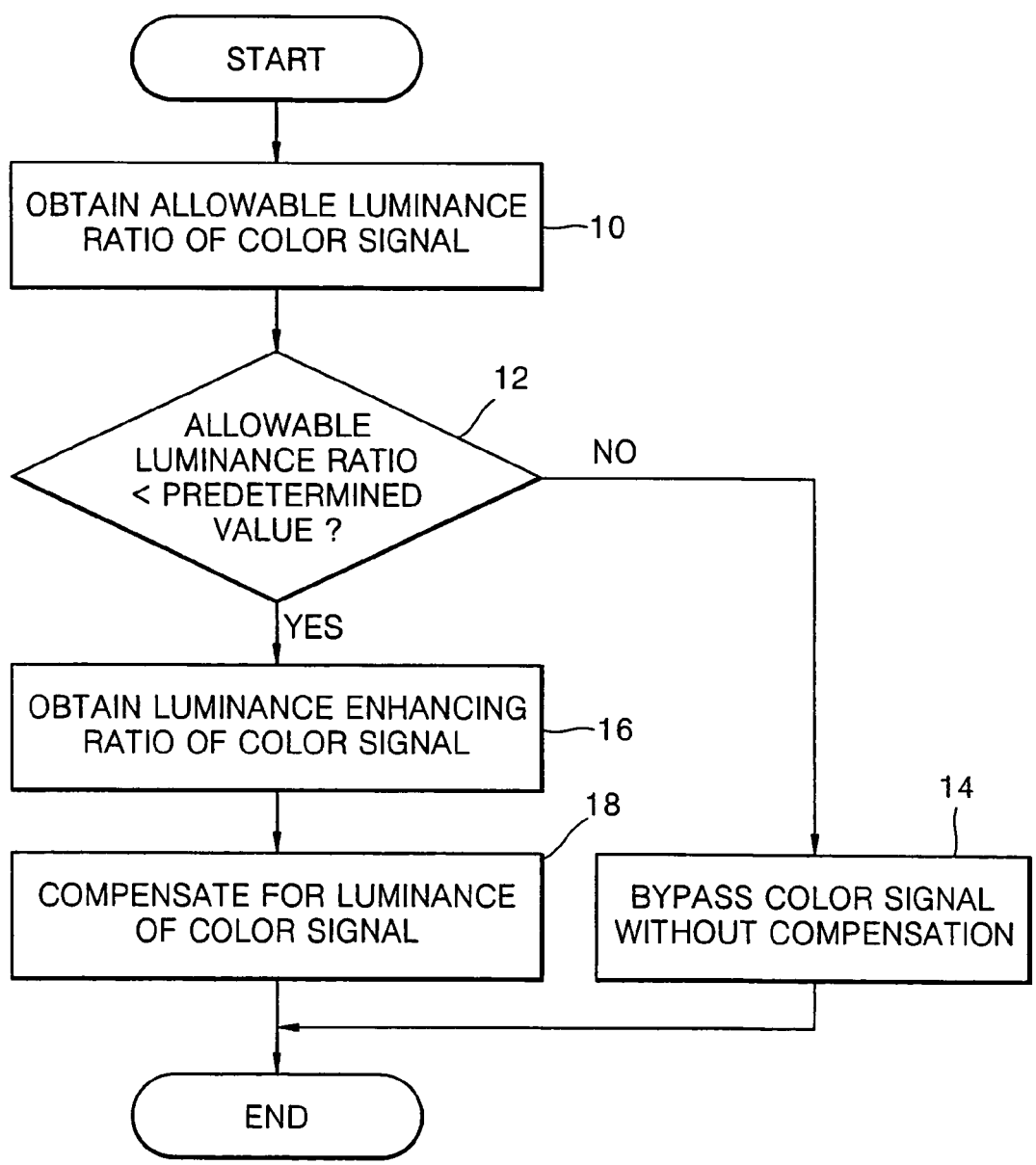
FIG. 3 is a flowchart illustrating a method of compensating for the luminance of a color signal according to an embodiment of the present invention.

FIG. 3 is a flowchart illustrating a method of compensating for the luminance of a color signal according to an embodiment of the present invention, wherein the luminance compensation method includes operations 10 through 18 which compensate for the luminance of a color signal using a luminance enhancing ratio obtained from an allowable luminance ratio of the color signal.

According to the present embodiment, in the color signal luminance compensation method, first, an allowable luminance ratio of a color signal is obtained in operation 10. Here, the allowable luminance ratio corresponds to a ratio between luminance according to saturation when a color signal is represented by four or more colors, and a luminance according to saturation when the color signal is represented by three colors.

After operation 10, it is determined in operation 12 whether the allowable luminance ratio is less than a specified value.

Figure 2:
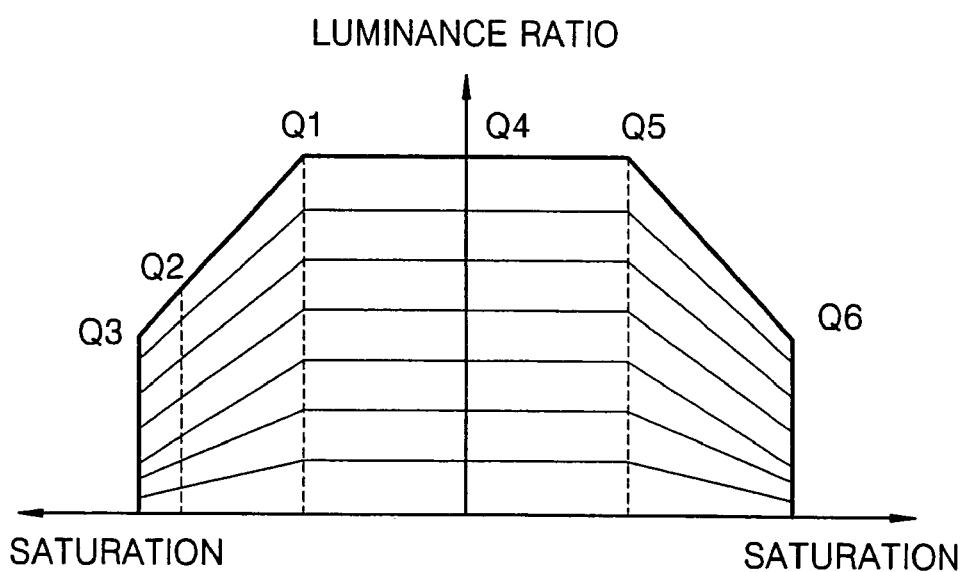
FIG. 2 is a view in which the color gamut is illustrated on a two-dimensional plane with a saturation axis and a luminance ratio axis in the multi-color image display of FIG. 1.

According to an embodiment of the present invention, the specified value may be a maximum luminance ratio of a color signal. That is, as seen in FIGS. 1 and 2, since a color range in which luminance is enhanced is Q1 through Q3 or Q5 through Q6, a luminance ratio at the location of Q1 or Q5 can be a specified value as a luminance enhancing threshold value.

According to an embodiment of the present invention, when pixels of an image are represented using Red, Green, Blue (R, G and B) color data and arbitrary color component(s) X, the specified value is a result obtained by dividing a luminance level of a corresponding pixel at a maximum value of an intensity level of the color component X by a luminance level of a corresponding pixel at a maximum value of an intensity level of RGBX. That is, the specified value C1 can be expressed by the following Equation 1.

$$C1 = \frac{\text{Luminance}(X - \text{channel})}{\text{Luminance}(RGBX - \text{channel})} \quad (1)$$

Here, Luminance (X-channel) is a luminance level of a pixel represented by RGBX when an intensity level of the RGB is minimal and an intensity level of X is maximal, and Luminance (RGBX-channel) is a luminance level of a pixel represented by RGBX when the intensity level of the RGBX is maximal.

If it is determined that the allowable luminance ratio exceeds or is the same as the specified value, the color signal is bypassed without any compensation in operation 14.

Conversely, if it is determined that the allowable luminance ratio is smaller than the specified value, a luminance enhancing ratio of the color signal is obtained using the allowable luminance ratio in operation 16. Also, if it is determined that the allowable luminance ratio is smaller than the specified value, the luminance enhancing ratio can be obtained using the specified value as well as the allowable luminance ratio in operation 16. After operation 16, in operation 18, the luminance of the color signal is compensated for, using the luminance enhancing ratio.

According to an embodiment of the present invention, as shown in FIG. 3, the color signal luminance compensation method includes operations 10 through 18.

However, the color signal luminance compensation method can include operations 10, 14, 16 and 18. In this case, after operation 10, a luminance enhancing ratio of the color signal is obtained in operation 16. At this time, according to the luminance enhancing ratio of the color signal, the luminance of the color signal is compensated for in operation 18 or the color signal is bypassed in operation 14 without compensation for the luminance of the color signal. For example, if the luminance enhancing ratio obtained in operation 16 is "0", the luminance of the color signal is not compensated for in operation 14. However, if the luminance enhancing ratio obtained in operation 16 is not "0", the luminance of the color signal is compensated for in operation 18.

Hereinafter, examples of operation 10 shown in FIG. 3 will be described with reference to the appended drawings.

Figure 4:
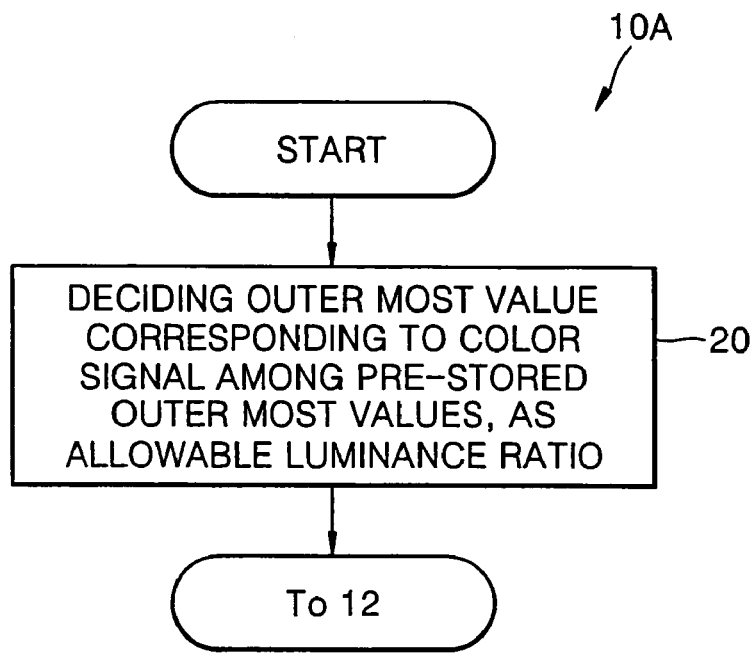
FIG. 4 is a flowchart illustrating an example of operation 10 of FIG. 3.

FIG. 4 is a flowchart illustrating an example 10A of operation 10 of FIG. 3 which includes operation 20 which decides a maximum value corresponding to a color signal as an allowable luminance ratio.

According to the example 10A of operation 10 shown in FIG. 3, a maximum value corresponding to a color signal among pre-stored maximum values capable of being represented in a multi-dimensional color space, is decided as an allowable luminance ratio, in operation 20.

Figure 5:
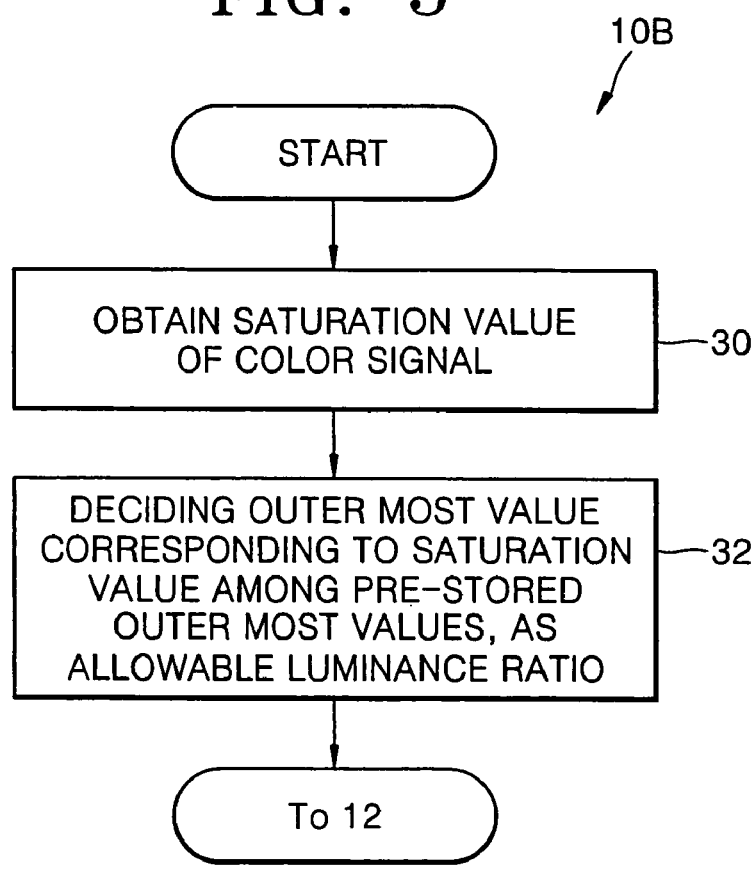
FIG. 5 is a flowchart illustrating another example of operation 10 of FIG. 3.

FIG. 5 is a flowchart illustrating another example 10B of operation 10 of FIG. 3 which includes operations 30 and 32 which decide a maximum value corresponding to a saturation value of a color signal as an allowable luminance ratio.

According to example 10B of operation 10 shown in FIG. 3, a saturation value of a color signal is obtained in operation 30.

Figure 6:
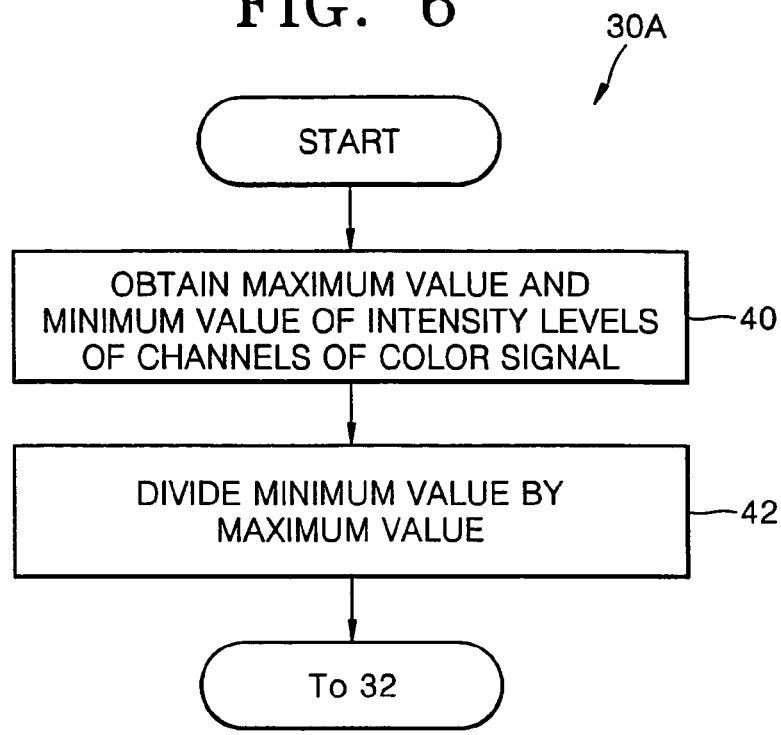
FIG. 6 is a flowchart illustrating an example of operation 30 of FIG. 5.

FIG. 6 is a flowchart illustrating an example 30A of operation 30 of FIG. 5 which includes operations 40 and 42 which obtain a saturation value using a maximum value and a minimum value of intensity levels of a color signal.

Referring to FIG. 6, the maximum value and the minimum value of the intensity levels of channels of a color signal are obtained in operation 40. After operation 40, the minimum value is divided by the maximum value and the divided result is decided as a saturation value in operation 42. That is, the saturation value Ch can be expressed by Equation 2.

$$Ch = \text{Min}(X1, X2, X3)/\text{Max}(X1, X2, X3) \quad (2)$$

Here, X1, X2, and X3 represent intensity levels of channels of a color signal and can be negative values. Max(X1, X2, X3) represents a maximum value of the intensity levels X1, X2 and X3 of channels of the color signal and Min(X1, X2, X3) represents a minimum value of the intensity levels X1, X2 and X3 of the channels of the color signal.

After operation 30, a maximum value corresponding to a saturation value among pre-stored maximum values capable of being represented in a multi-dimensional color space is decided as an allowable luminance value in operation 32.

Figure 7:
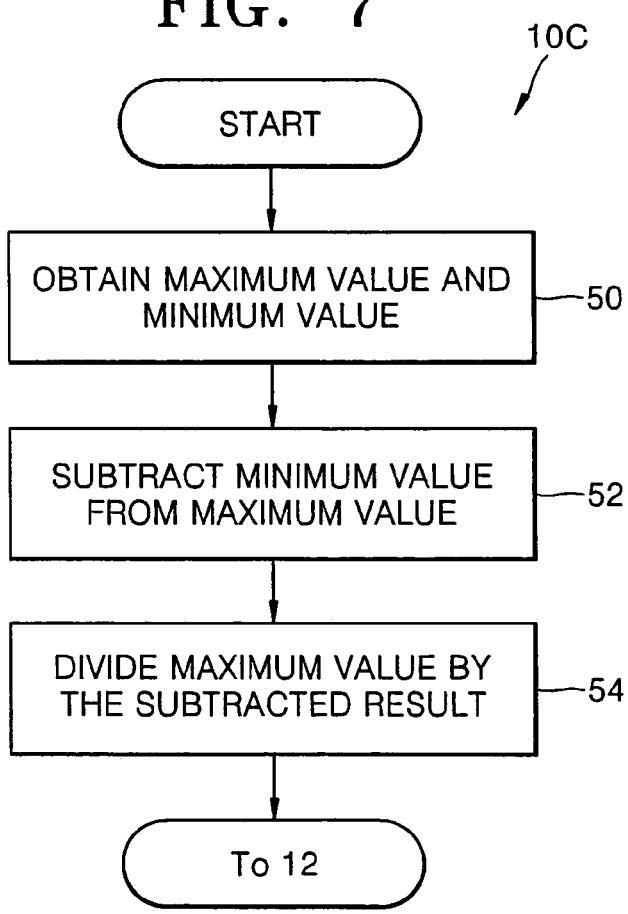
FIG. 7 is a flowchart illustrating another example of operation 10 of FIG. 3.

FIG. 7 is a flowchart illustrating still another example 10C of operation 10 of FIG. 3 which includes operations 50 through 54 which obtain an allowable luminance ratio using a maximum value and a minimum value of intensity levels X1, X2 and X3 of channels of a color signal.

According to example 10C of operation 10 shown in FIG. 3, a maximum value Max(X1, X2, X3) and a minimum value Min(X1, X2, X3) of the intensity levels X1, X2 and X3 of the channels of a color signal are obtained in operation 50. After operation 50, in operation 52, the minimum value Min(X1, X2, X3) is subtracted from the Maximum value Max(X1, X2, X3). After operation 52, in operation 54, the maximum value is divided by the subtracted result and the divided result is decided as an allowable luminance ratio. That is, the allowable luminance ratio aBrt can be expressed by Equation 3.

$$aBrt = \frac{\text{Max}(X1, X2, X3)}{\text{Max}(X1, X2, X3) - \text{Min}(X1, X2, X3)} \quad (3)$$

If operation 12 is not provided to the color signal luminance compensation method shown in FIG. 3, the process proceeds to operation 16 instead of operation 12 after operations 20, 32 and 54 shown in FIGS. 4, 5 or 7.

Hereinafter, examples of operation 16 of FIG. 3 will be described with reference to the appended drawings.

Figure 8:
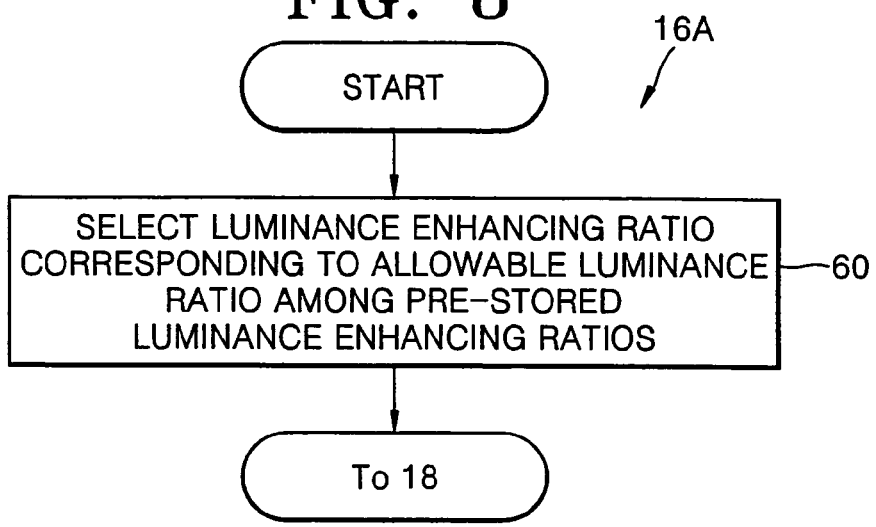
FIG. 8 is a flowchart illustrating a example of operation 16 of FIG. 3.

FIG. 8 is a flowchart illustrating an example 16A of operation 16 of FIG. 3 which includes operation 60 which selects a luminance enhancing ratio corresponding to an allowable luminance ratio.

According to example 16A of operation 16 shown in FIG. 3, a luminance enhancing ratio corresponding to an allowable luminance ratio among pre-stored luminance enhancing ratios is selected and the process proceeds to operation 18, in operation 60.

Figure 9:
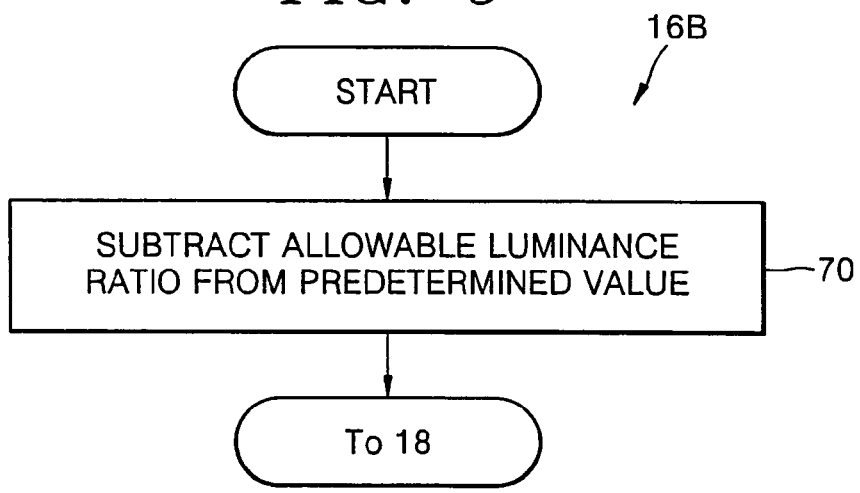
FIG. 9 is a flowchart illustrating another example of operation 16 of FIG. 3.

FIG. 9 is a flowchart illustrating another example 16B of operation 16 of FIG. 3 which includes operation 70 which obtains a luminance enhancing ratio by subtracting the allowable luminance ratio from a specified value.

According to example 16B of operation 16 shown in FIG. 3, in operation 70, the allowable luminance ratio is subtracted from the specified value, the subtracted result is decided as a luminance enhancing ratio and the process proceeds to operation 18. That is, the luminance enhancing ratio B_inc can be expressed by Equation 4.

$$B\_inc = C2 \times (C1 - aBrt) \qquad (4)$$

Here, C2 is a first control constant and the magnitude of the luminance enhancing ratio B_inc can be changed by the first control constant.

Figure 10:
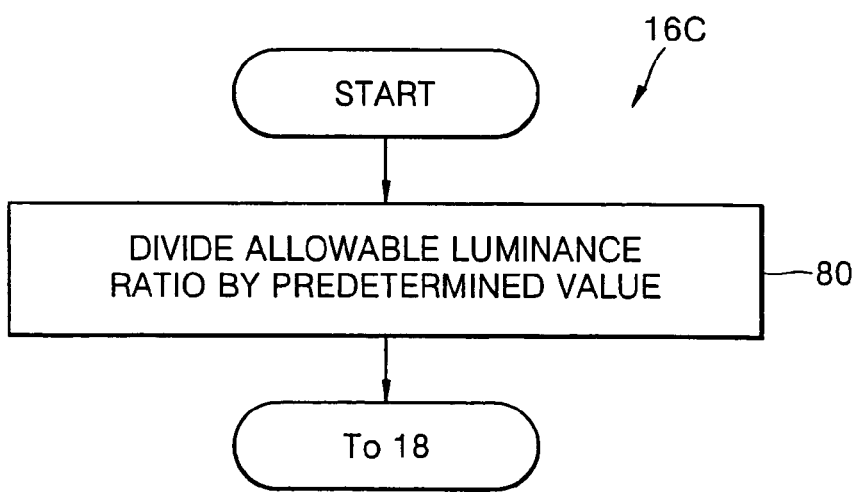
FIG. 10 is a flowchart illustrating another example of operation 16 of FIG. 3.

FIG. 10 is a flowchart illustrating still another example 16C of operation 16 of FIG. 3 which includes operation 80 which obtains a luminance enhancing ratio by dividing an allowable luminance ratio by a specified value.

According to example 16C of operation 16 shown in FIG. 3, in operation 80, the allowable luminance ratio is divided by the specified value, the divided result is decided as a luminance enhancing ratio and the process proceeds to operation 18. That is, the luminance enhancing ratio B_inc can be expressed by Equation 5.

$$B\_inc = C3 \times \frac{aBrt}{C1} \qquad (5)$$

Here, C3 is a second control constant and the magnitude of the luminance enhancing ratio B_inc can be changed by the second control constant.

Hereinafter, examples of operation 18 of FIG. 3 will be described with reference to the appended drawings.

Figure 11:
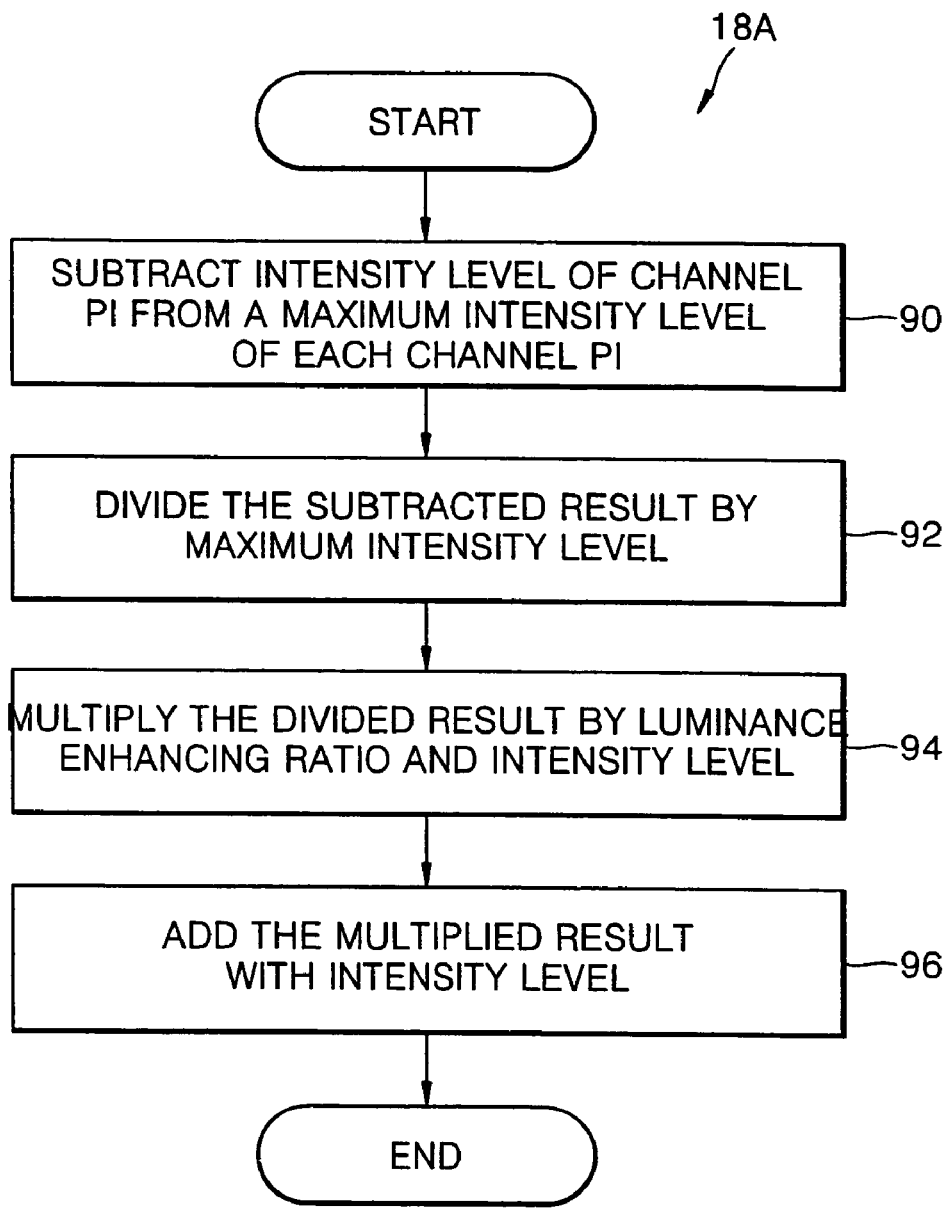
FIG. 11 is a flowchart illustrating an example of operation 18 of FIG. 3.

FIG. 11 is a flowchart illustrating an example 18A of operation 18 of FIG. 3 which includes operations 90 through 96 which compensate for the luminance of a color signal using a maximum intensity level and a luminance enhancing ratio.

According to example 18A of operation 18 shown in FIG. 3, in operation 90, an intensity level Xi of each (1 i 3) of channels Pi of a color signal is subtracted from a maximum intensity level of each channel Pi of the color signal. The result subtracted in operation 90 is divided by the maximum intensity level in operation 92. After operation 92, the divided result is multiplied by the luminance enhancing ratio and the intensity level Xi in operation 94. After operation 94, the multiplied result is added to the intensity level Xi and the added result is decided as a luminance-compensated result Pi' of the channel Pi, in operation 96. That is, the luminance-compensated result Pi' of each channel Pi of the color signal can be expressed by Equation 6.

$$Pi' = Xi \times \left(1 + B\_inc \frac{MaxValue - Xi}{maxValue}\right) \qquad (6)$$

Here, maxValue is a maximum intensity level of each channel Pi of a color signal and corresponds to 256 if the color signal is a 8-bit signal.

Figure 12:
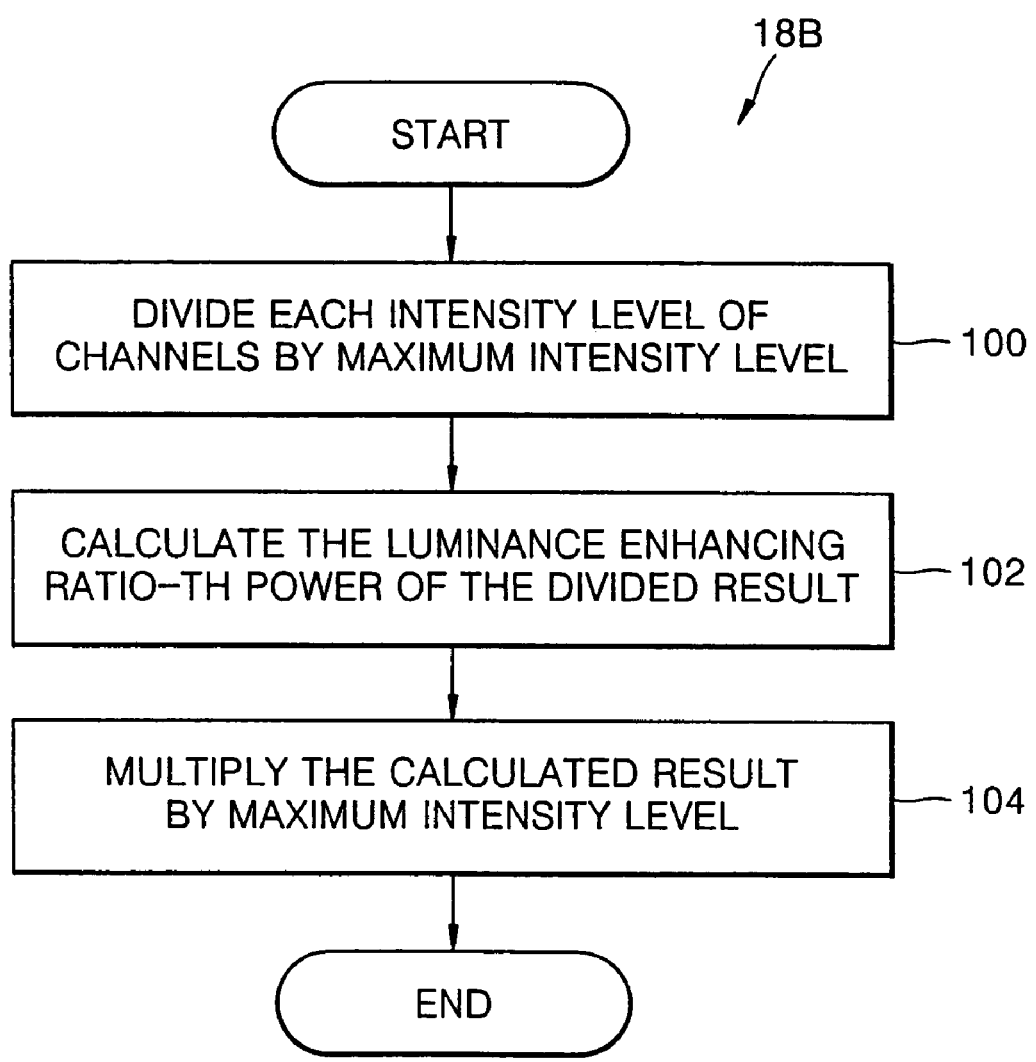
FIG. 12 is a flowchart illustrating another embodiment of operation 18 of FIG. 3.

FIG. 12 is a flowchart illustrating another example 18B of operation 18 of FIG. 3 which includes operations 100 through 104 which compensate for the luminance of a color signal using a maximum intensity level and a luminance enhancing ratio.

According to example 18B of operation 18 shown in FIG. 3, an intensity level Xi of each channel Pi of a color signal is divided by a maximum intensity level maxValue of each channel Pi of the color signal in operation 100. After operation 100, in operation 102, the luminance enhancing ratio (B_inc)-th power of the divided result is calculated. After operation 102, the calculated result is multiplied by the maximum intensity level maxValue and the multiplied result is decided as a luminance-compensated result Pi' of the channel Pi in operation 104. That is, the luminance-compensated result Pi' of each channel Pi of the color signal can be expressed by Equation 7.

$$Pi' = \left(\frac{Xi}{maxValue}\right)^{B\_inc} \times X\ maxValue \qquad (7)$$

Figure 13:
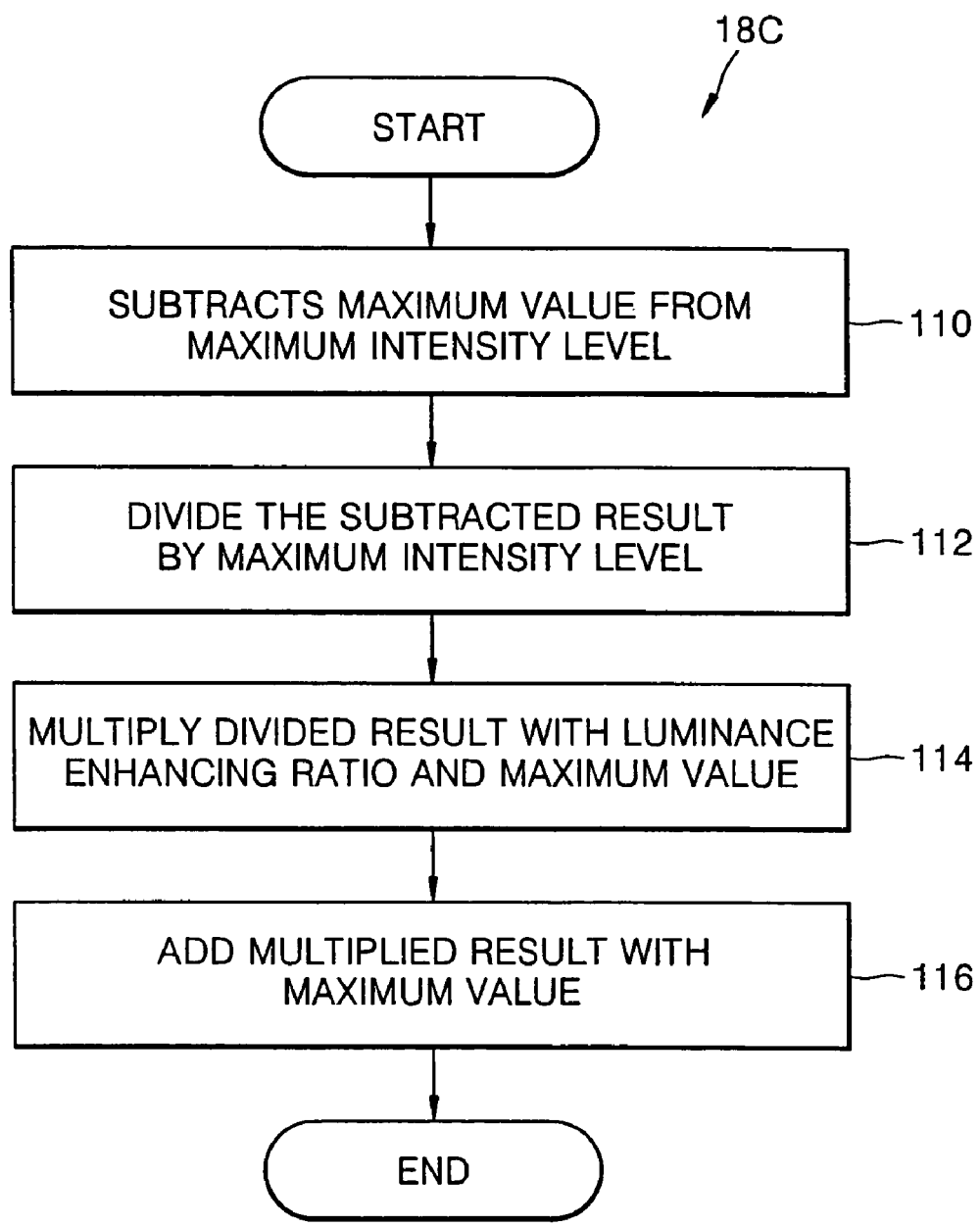
FIG. 13 is a flowchart illustrating another embodiment of operation 18 of FIG. 3.

FIG. 13 is a flowchart illustrating still another example 18C of operation 18 of FIG. 3 which includes operations 110 through 116 which compensate for the luminance of a color signal using a maximum intensity level and a luminance enhancing ratio.

According to example 18C of operation 18 shown in FIG. 3, a maximum value Max of intensity levels X1, X2 and X3 of channels of a color signal is subtracted from a maximum intensity level maxValue of each channel Pi of the color signal in operation 110. After operation 110, the subtracted result is divided by the maximum intensity level maxValue in operation 112. After operation 112, the divided result is multiplied by the luminance enhancing ratio B_inc and the maximum value Max in operation 114. After operation 114, the multiplied result is added with the maximum value Max and the added result is decided as a luminance-compensated result Pi' of each channel Pi in operation 116. That is, the luminance-compensated result Pi' of the color signal can be expressed by Equation 8.

$$Pi' = Max \times \left(1 + B\_inc \frac{MaxValue - Max}{maxValue}\right) \qquad (8)$$

Operations 90 through 96 shown in FIG. 11 are performed on each channel Pi of a color signal, operations 100 through 104 shown in FIG. 12 are performed on each channel Pi of the color signal and operations 110 through 116 shown in FIG. 13 are performed on each channel Pi of the color signal.

Hereinafter, the configuration and operations of a color signal luminance compensation apparatus according to an embodiment of the present invention will be described.

Figure 14:
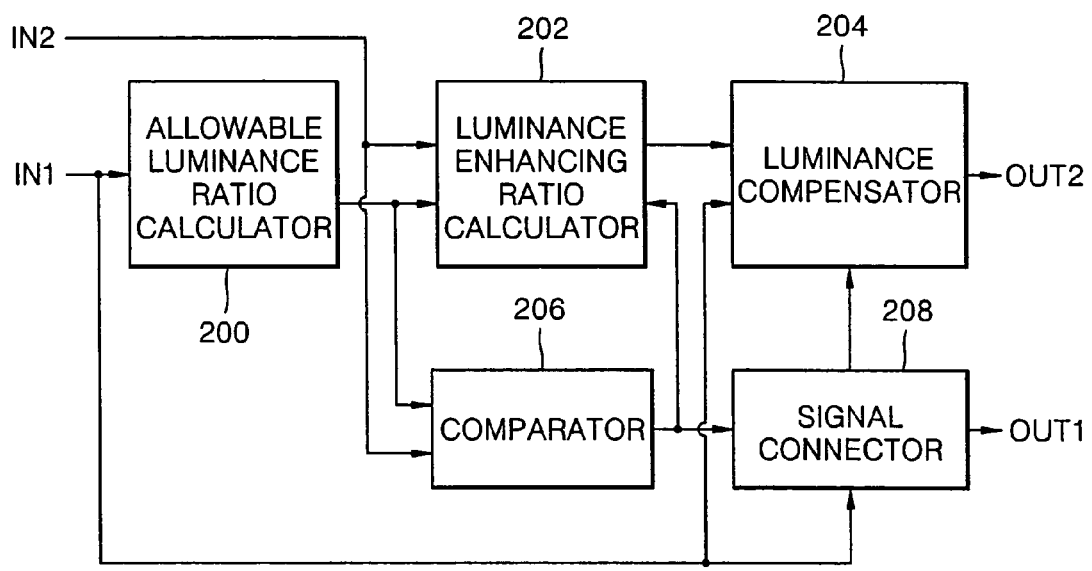
FIG. 14 is a block diagram of an apparatus for compensating for the luminance of a color signal according to an embodiment of the present invention.

FIG. 14 is a block diagram of a color signal luminance compensation apparatus according to an embodiment of the present invention, wherein the luminance compensation apparatus includes an allowable luminance ratio calculator 200, a luminance enhancing ratio calculator 202, a luminance compensation unit 204, a comparator 206 and a signal connector 208.

The luminance compensation apparatus shown in FIG. 14 serves to perform the color signal luminance compensation method shown in FIG. 3.

In order to perform operation 10 shown in FIG. 3, the allowance luminance ratio calculator 200 calculates an allowable luminance ratio of a color signal received through an input terminal IN1 and outputs the calculated allowable luminance ratio respectively to the luminance enhancing ratio calculator 202 and the comparator 206.

In order to perform operation 12, the comparator 206 compares the allowable luminance ratio received from the allowable luminance ratio calculator 200 with a specified value received through an input terminal IN2, and outputs the compared result. At this time, the signal connector 208 outputs the color signal received through the input terminal IN1 to the luminance compensation unit 204 or bypasses the color signal to an external source through an output terminal OUT1, in response to the compared result from the comparator 206. If the signal connector 208 determines through the compared result received from the comparator 206 that the allowable luminance ratio exceeds a specified value, the signal connector 208 bypasses the color signal received through the input terminal IN1 to the output terminal OUT1 without compensating for the luminance of the color signal in order to perform operation 14. However, if the signal connector 208 determines through the compared result received from the comparator 206 that the allowable luminance ratio is smaller than the specified value, the signal connector 208 outputs the color signal received through the input terminal IN1 to the luminance compensation unit 204.

To perform operation 16, the luminance enhancing ratio calculator 202 calculates a luminance enhancing ratio of the color signal using the allowable luminance ratio received from the allowable luminance ratio calculator 200, and outputs the calculated allowable enhancing ratio to the luminance compensator 204. At this time, the luminance enhancing ratio calculator 202 can calculate a luminance enhancing ratio using the allowable luminance ratio received from the allowable luminance ratio calculator 200 and the specified value received through the input terminal IN2.

According to the present embodiment, the luminance enhancing ratio calculator 202 can calculate a luminance enhancing ratio in response to the result compared by the comparator 206. For example, if it is determined through the compared result received from the comparator 206 that the allowable luminance ratio is less than the specified value, the luminance enhancing ratio calculator 202 calculates a luminance enhancing ratio of the color signal. However, if it is determined through the compared result received from the comparator 206 that the allowable luminance ratio exceeds the specified value, the luminance enhancing ratio calculator 202 does not calculate the luminance enhancing ratio of the color signal.

To perform operation 18, the luminance compensator 204 compensates for the luminance of a color signal received from the signal connector 208 using the luminance enhancing ratio received from the luminance enhancing ratio calculator 202, and outputs a luminance-compensated result through an output terminal OUT2. At this time, the luminance-compensated result is output to a display panel (not shown) or a multi-color calculator (not shown). Here, the display panel processes the luminance-compensated result so that the luminance-compensated result can be displayed. The multi-color calculator pre-processes the luminance-compensated result and then transfers the pre-processed result to the display panel.

If the color signal luminance compensation method shown in FIG. 3 does not include operation 12, the luminance compensation apparatus shown in FIG. 14 does not have the compensator 206 and the signal connector 208. In this case, according to the present embodiment of the present invention, the luminance compensator 204 can perform operation 14 or operation 18 in response to the luminance enhancing ratio received from the luminance enhancing ratio calculator 202.

For example, in the case where the luminance enhancing ratio calculator 202 calculates a luminance enhancing ratio using Equation 4, if a luminance enhancing ratio received from the luminance enhancing ratio calculator 202 is "0," the luminance compensator 204 bypasses the luminance of a color signal received through the input terminal IN1 to the output terminal OUT2 without compensating for the luminance of the color signal, in operation 14. However, if the luminance enhancing ratio received from the luminance enhancing ratio calculator 202 is not "0," the luminance compensator 204 compensates for the luminance of the color signal received through the input terminal IN1 and outputs the luminance-compensated result through the output terminal OUT2 in operation 18.

Hereinafter, the configurations and operations of examples of the allowable luminance ratio calculator 200 shown in FIG. 14 will be described with reference to the appended drawings.

Figure 15:
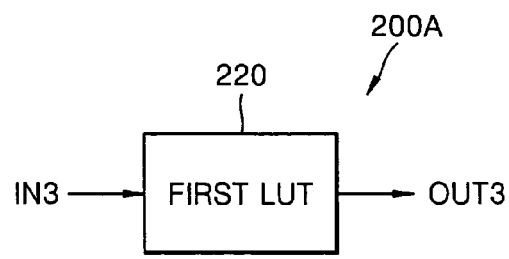
FIG. 15 is a block diagram of the allowable luminance calculator of FIG. 14.

FIG. 15 is a block diagram of an example 200A of the allowable luminance ratio calculator 200 of FIG. 14, wherein the allowable luminance ratio calculator 200A includes a first lookup table (LUT) 220.

The allowable luminance ratio calculator 200A of FIG. 15 serves to perform operation 10A of FIG. 4. That is, to perform operation 20, the first LUT 220 stores in advance, as data, maximum values capable of being represented in a multi-dimensional color space in advance, reads a corresponding maximum value in response to a color signal received through an input terminal IN3 as an address, and outputs the read value as an allowable luminance ratio through an output terminal OUT3 to the luminance enhancing ratio calculator 202 and the comparator 206. For that, a relationship between three channel intensity levels X1, X2 and X3 of a color signal received through the input terminal IN3 and an allowable luminance ratio is stored in advance in the lookup table.

Figure 16:
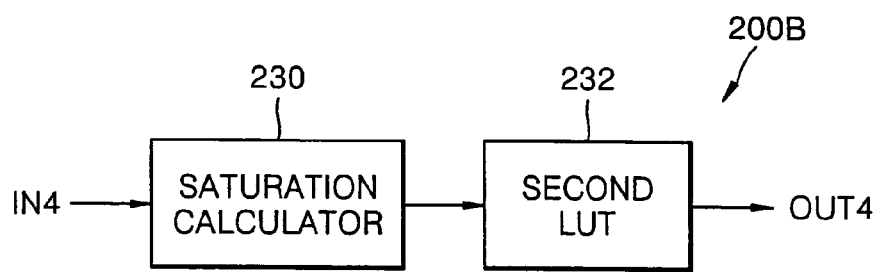
FIG. 16 is a block diagram of another example of the allowable luminance calculator of FIG. 14.

FIG. 16 is a block diagram of another example 200B of the allowable luminance ratio calculator 200 of FIG. 14, wherein the allowable luminance ratio calculator 200B includes a saturation calculator 230 and a second lookup table (LUT) 232.

The allowable luminance ratio calculator 200B shown in FIG. 16 serves to perform operation 10B of FIG. 5. That is, to perform operation 30, the saturation calculator 230 calculates a saturation value of a color signal received through an input terminal IN4 and outputs the calculated saturation value to the second LUT 232. At this time, to perform operation 32, the second LUT 232 stores, as data, maximum values capable of being represented in a multi-dimensional color space in advance, reads a corresponding maximum value in response to a saturation value received from the saturation calculator 230 as an address, and outputs the read value as an allowable luminance ratio through an output terminal OUT4 to the luminance enhancing ratio calculator 202 and the comparator 206.

Figure 17:
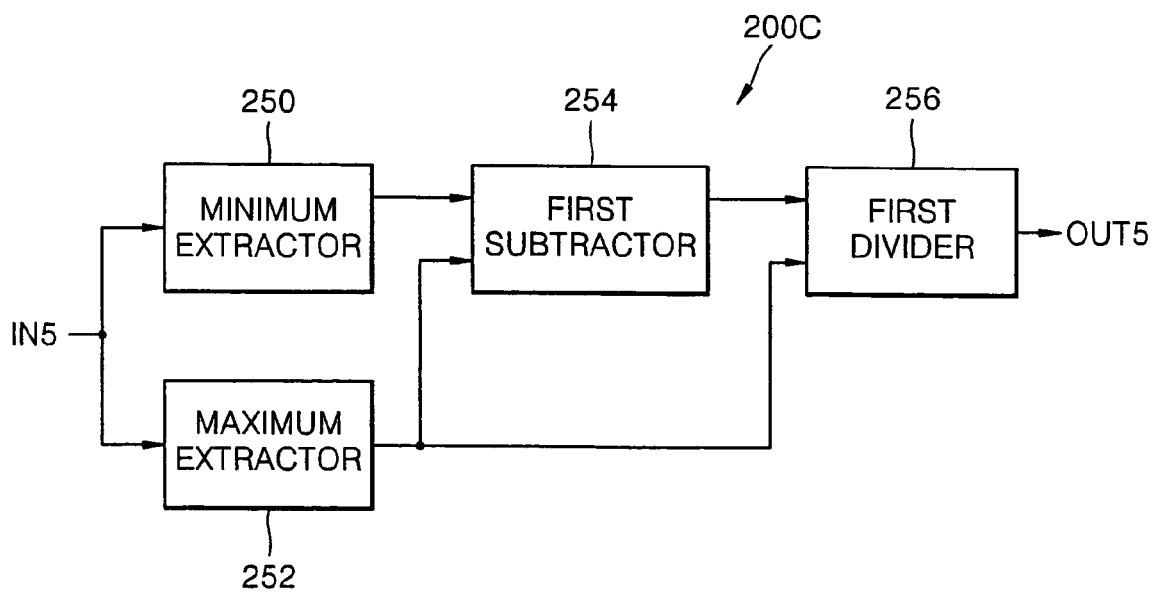
FIG. 17 is a block diagram of another example of the allowable luminance calculator of FIG. 14.

FIG. 17 is a block diagram of another example 200C of the allowable luminance ratio calculator 200 of FIG. 14, wherein the allowable luminance ratio calculator 200C includes a minimum value extractor 250, a maximum value extractor 252, a first subtractor 254 and a first divider 256.

The allowable luminance ratio calculator 200C shown in FIG. 17 serves to perform operation 10C shown in FIG. 7. That is, the minimum value extractor 250 and the maximum value extractor 252 serve to perform operation 50. Here, the minimum value extractor 250 extracts a minimum value of intensity levels of channels of a color signal received through an input terminal IN5 and outputs the extracted minimum value to the first subtractor 254. The maximum value extractor 252 extracts a maximum value of intensity levels of channels of a color signal received through the input terminal IN5 and outputs the extracted maximum value to the first subtractor 254.

To perform operation 52, the first subtractor 254 subtracts a minimum value received from the minimum value extractor 250 from a maximum value received from the maximum value extractor 252 and outputs the subtracted result to the first divider 256.

To perform operation 54, the first divider 256 divides the maximum value received from the maximum value extractor 252 by the result subtracted by the first subtractor 254 and outputs the divided result as an allowable luminance ratio through the output terminal OUT5 to the luminance enhancing ratio calculator 202 and the comparator 206.

Hereinafter, the configurations and operations of the luminance enhancing ratio calculator 202 shown in FIG. 14 will be described with reference to the appended drawings.

Figure 18:
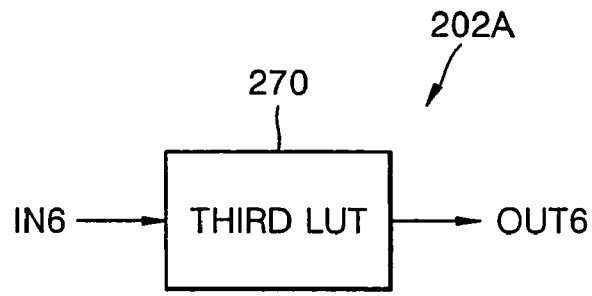
FIG. 18 is a block diagram of the luminance enhancing ratio calculator of FIG. 14.

FIG. 18 is a block diagram of an example 202A of the luminance enhancing ratio calculator 202 of FIG. 14, wherein the luminance enhancing ratio calculator 202A includes a third LUT 270.

The luminance enhancing ratio calculator 202A shown in FIG. 18 serves to perform operation 16A shown in FIG. 8. To perform operation 60, the third LUT 270 stores luminance enhancing ratios as data in advance, and reads a corresponding luminance enhancing ratio in response to an allowable luminance ratio received from the allowable luminance ratio calculator 200 through an input terminal IN6 as an address, and outputs the read ratio to the luminance compensator 204 through an output terminal OUT6.

Figure 19:
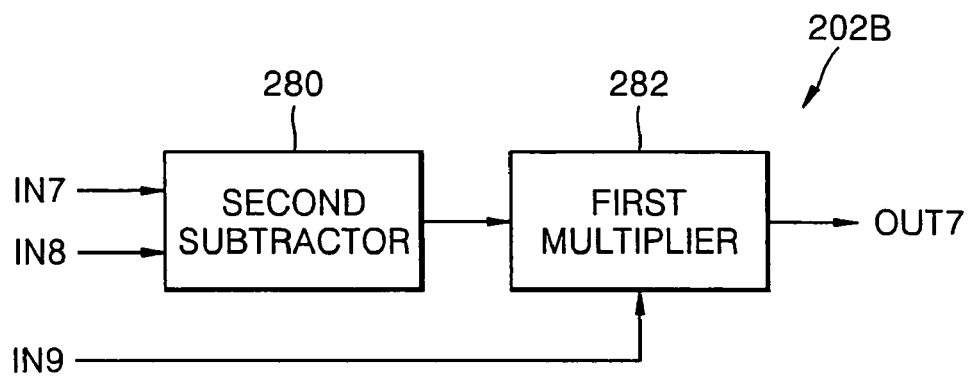
FIG. 19 is a block diagram of another example of the luminance enhancing ratio calculator of FIG. 14.

FIG. 19 is a block diagram of another example 202B of the luminance enhancing ratio calculator 202 of FIG. 14, wherein the luminance enhancing ratio calculator 202B includes a second subtractor 280 and a first multiplier 282.

The luminance enhancing ratio calculator 202B shown in FIG. 19 serves to perform operation 16B shown in FIG. 9. To perform operation 70, the second subtractor 280 subtracts an allowable luminance ratio received from the allowable luminance ratio calculator 200 through an input terminal IN8, from a specified value received through an input terminal IN7, and outputs the subtracted result. Here, the luminance enhancing ratio calculator 202B shown in FIG. 19 can further include a first multiplier 282. The first multiplier 282 multiplies a first control constant C2 received through an input terminal IN9 by the result subtracted by the second subtractor 280, and outputs the multiplied result as a luminance enhancing ratio through an output terminal OUT7.

Figure 20:
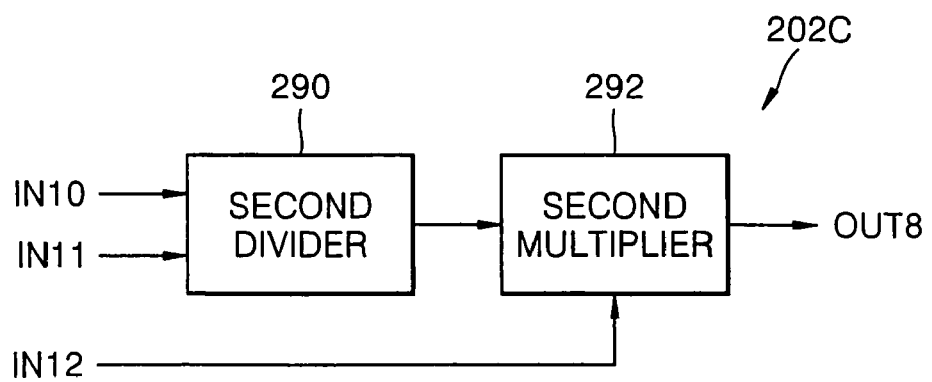
FIG. 20 is a block diagram of another example of the luminance enhancing ratio calculator of FIG. 14.

FIG. 20 is a block diagram of another example 202C of the luminance enhancing ratio calculator 202 of FIG. 14, wherein the luminance enhancing ratio calculator 202C includes a second divider 290 and a second multiplier 292.

The luminance enhancing ratio calculator 202C serves to perform operation 16C shown in FIG. 10. To perform operation 80, the second divider 290 divides an allowable luminance ratio received from the allowable luminance ratio calculator 200 through an input terminal IN10 by a specified value received through an input terminal IN11, and outputs the divided result. At this time, the luminance enhancing ratio calculator 202C can further include a second multiplier 292. Here, the second multiplier 292 multiplies a second control constant C3 received through an input terminal IN12 by the result divided by the second divider 290, and outputs the multiplied result as a luminance enhancing ratio through an output terminal OUT8.

Figure 21:
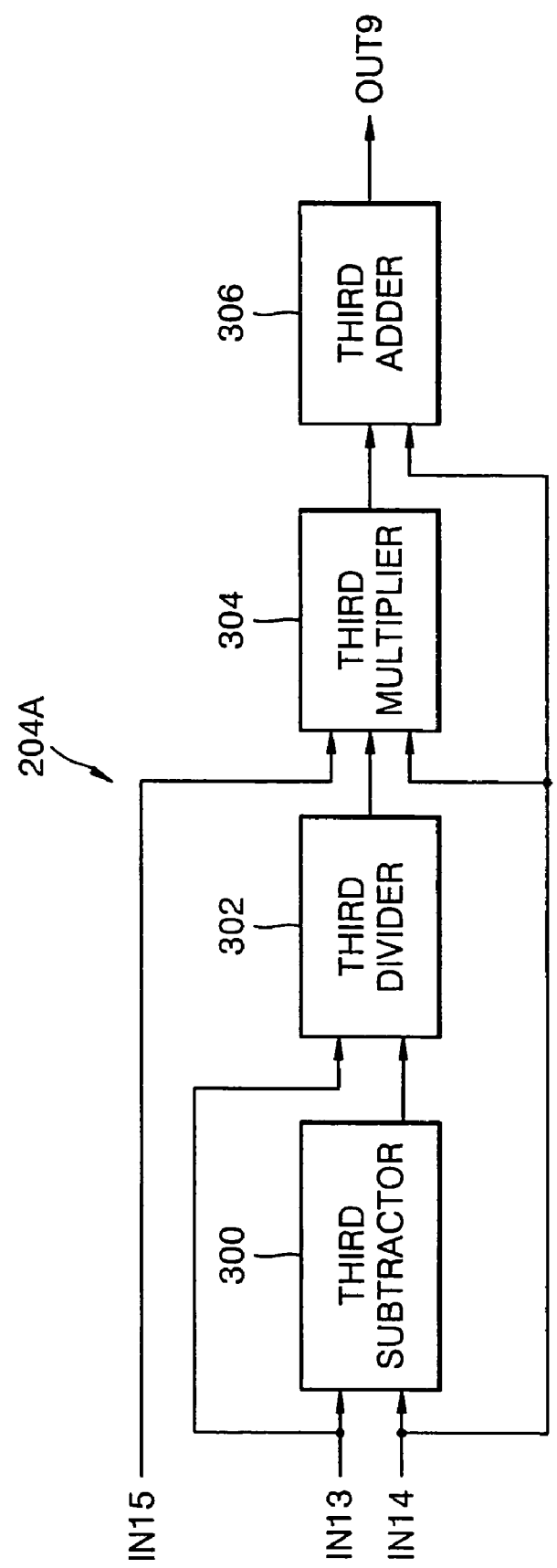
FIG. 21 is a block diagram of the luminance compensator of FIG. 14.

FIG. 21 is a block diagram of an example 204A of the luminance compensator 204 of FIG. 14, wherein the luminance compensator 204A includes a third subtractor 300, a third divider 302, a third multiplier 304 and a first adder 306.

The luminance compensator 204A shown in FIG. 21 serves to perform operation 18A shown in FIG. 11. To perform operation 90, the third subtractor 300 subtracts an intensity level Xi of a channel Pi received through an input terminal IN14 from a maximum intensity level maxValue of each channel Pi of a color signal received through an input terminal IN13, and outputs the subtracted result to the third divider 302.

To perform operation 92, the third divider 302 divides the result subtracted by the third subtractor 300 by the maximum intensity level maxValue of each the channel Pi of the color signal received through the input terminal IN13, and outputs the divided result to the third multiplier 304. To perform operation 94, the third multiplier 304 multiplies the result divided by the third divider 302 by a luminance enhancing ratio B_inc received through an input terminal IN15 and the intensity level Xi received through the input terminal IN14, and outputs the multiplied result to the first adder 306. To perform operation 96, the first adder 306 adds the result multiplied by the third multiplier 304 with the intensity level Xi received through the input terminal IN14, and outputs the added result as a luminance-compressed result Pi' of the channel Pi through the output terminal OUT9.

Figure 22:
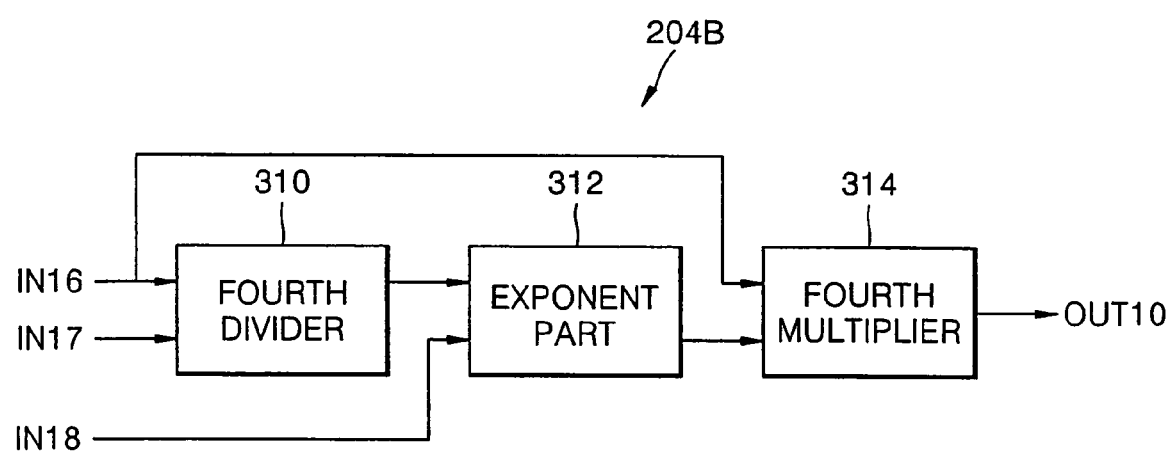
FIG. 22 is a block diagram of another example of the luminance compensator of FIG. 14.

FIG. 22 is a block diagram of another example 204B of the luminance compensator 204 of FIG. 14, wherein the luminance compensator 204B includes a fourth divider 310, an exponent part 312, and a fourth multiplier 314.

The luminance compensator 204B shown in FIG. 22 serves to perform operation 18B shown in FIG. 12. To perform operation 100, the fourth divider 310 divides an intensity level Xi of each channel Pi of a color signal received through an input terminal IN17 by a maximal intensity level maxValue of each channel Pi of a color signal received through an input terminal IN16, and outputs the divided result to the exponent part 312.

To perform operation 102, the exponent part 312 calculates the luminance enhancing ratio (B_inc)-th power of the result divided by the fourth divider 310, wherein the luminance enhancing ratio B_inc is received from the luminance enhancing ratio calculator 202 through an input terminal 18, and outputs the calculated result to the fourth multiplier 314. To perform operation 104, the fourth multiplier 314 multiplies the maximum intensity level maxValue of each the channel Pi of the color signal received through the input terminal IN16 by the result calculated by the exponent part 312, and outputs the multiplied result as a luminance-compensated result Pi' of the channel Pi through an output terminal OUT10.

Figure 23:
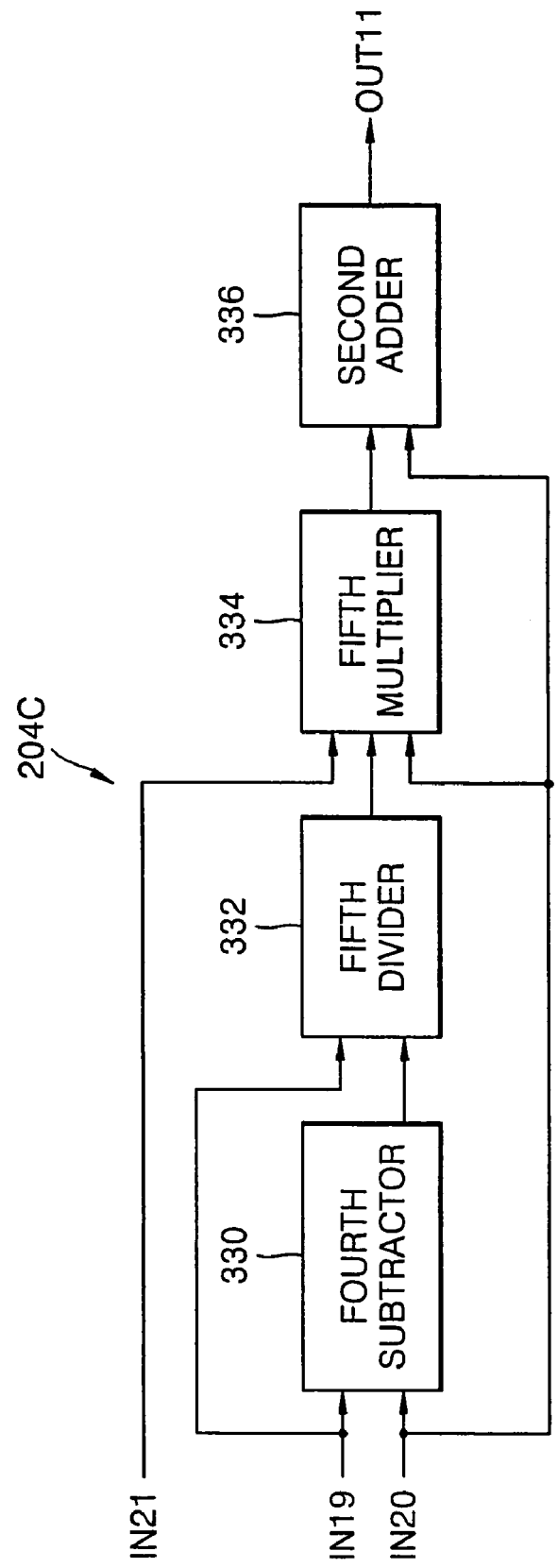
FIG. 23 is a block diagram of another example of the luminance compensator of FIG. 14.

FIG. 23 is a block diagram of another example 204C of the luminance compensator 204 of FIG. 14, wherein the luminance compensator 204C includes a fourth subtractor 330, a fifth divider 332, a fifth multiplier 334 and a second adder 336.

The luminance compensator 204C shown in FIG. 23 serves to perform operation 18C shown in FIG. 13. To perform operation 110, the fourth subtractor 330 subtracts a maximum value MAX of intensity levels of a color signal received through an input terminal IN20 from a maximum intensity level maxValue of each channel Pi of a color signal received through an input terminal IN19, and outputs the subtracted result to the fifth divider 332.

To perform operation 112, the fifth divider 332 divides the result subtracted by the fourth subtractor 330 by the maximum intensity level maxValue of each the channel Pi of the color signal received through the input terminal IN19, and outputs the divided result to the fifth multiplier 334. To perform operation 114, the fifth multiplier 334 multiplies the result divided by the fifth divider 332 by a luminance enhancing ratio B_inc received through an input terminal IN21 and the maximum value MAX received through the input terminal IN20, and outputs the multiplied result to the second adder 336. To perform operation 116, the second adder 336 adds the result multiplied by the fifth multiplier 334 with the maximum value MAX received through the input terminal IN20, and outputs the added result as a luminance-compensated result Pi' of the channel Pi through an output terminal OUT11.

Figure 24:
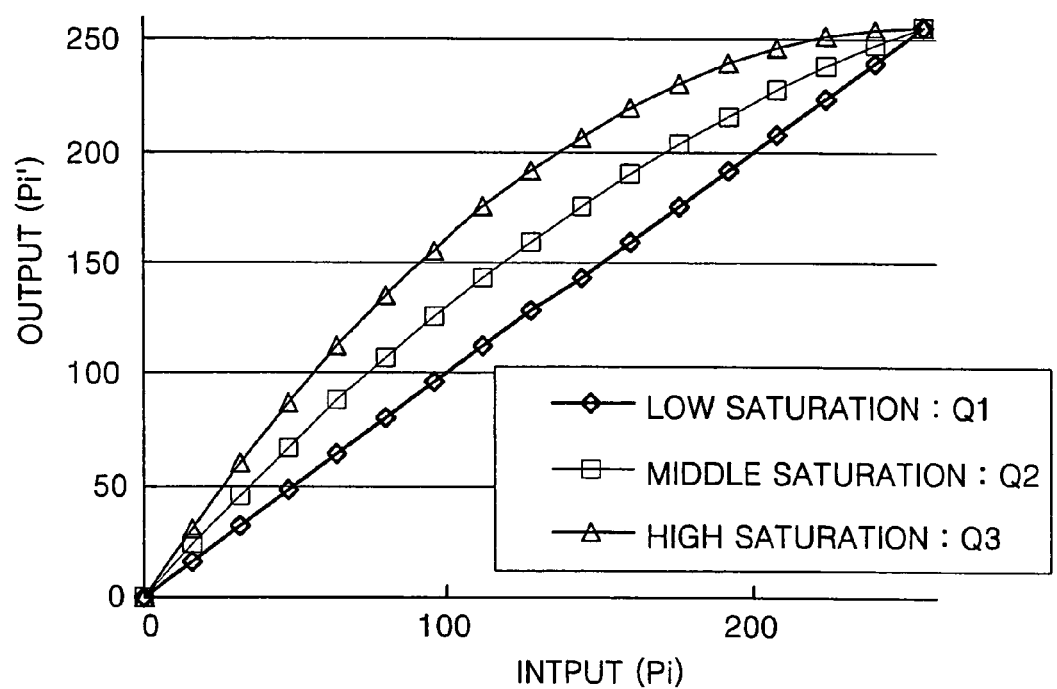
FIG. 24 is a graph illustrating a relationship between an input color signal and an output color signal.

FIG. 24 is a graph illustrating a relationship between the input color signal Pi and the output color signal Pi', wherein the horizontal axis of the graph represents an input color signal Pi given to the color signal luminance compensation method or apparatus according to the present invention and the vertical axis of the graph represents an output color signal Pi' obtained from the input color signal Pi by the color signal luminance compensation method or apparatus according to embodiments of the present invention.

Referring to FIG. 2 and FIG. 24, in a case of a point Q1 with a low saturation, a relationship between an input signal Pi and an output signal Pi' is linear. However, in a case of a point Q3 with a high saturation, the output signal Pi' becomes greater near the middle level of the input signal Pi. Also, in a case of a point Q2 with a middle saturation, the output signal Pi' has an intermediate value between the high saturation and the low saturation. In the graph shown in FIG. 24, the amplitude of the non-linear curve can be controlled by the first and/or second constants C2 and/or C3 provided in Equations 4 and/or 5.

As described above, according to the described embodiments of the color signal luminance compensation method and apparatus of the present invention, if a difference between an allowable luminance ratio of a color signal and a specified value exists, a luminance enhancing ratio is adjusted according to a saturation value of the color signal, the difference between the allowable luminance ratio and the specified value, or the result of dividing the allowable luminance value by the specified value, thereby reducing a luminance difference between a signal with a high saturation and a signal with a low saturation. That is, by increasing or decreasing the luminance of an input color signal in proportion to the saturation of the input color signal, it is possible to improve luminances of color signals with low or middle intensity levels and thereby avoid deterioration of picture quality.

Although a few embodiments of the present invention have been shown and described, the present invention is not limited to the described embodiments. Instead, it would be appreciated by those skilled in the art that changes may be made in these embodiments without departing from the principles and spirit of the invention, the scope of which is defined by the claims and their equivalents.

What is claimed is:

1. A method of compensating for a luminance of a color signal, comprising:
  obtaining an allowable luminance ratio of a color signal, the allowable luminance ratio being a ratio of a luminance according to saturation when the color signal is represented by four or more multiple primary colors to a luminance according to saturation when the color signal is represented by three colors;
  obtaining a luminance enhancing ratio of the color signal using the allowable luminance ratio; and
  compensating for a luminance of the color signal using the luminance enhancing ratio.

2. The method of claim 1, wherein the obtaining a luminance enhancing ratio includes obtaining the luminance enhancing ratio using the allowable luminance ratio and a specified value.

3. The method of claim 2, wherein the specified value is a maximum luminance ratio of the color signal.

4. The method of claim 2, wherein, when pixels of an image are represented using Red, Green, Blue (R, G and B) and an arbitrary color component X color data, the specified value is a result obtained by dividing a luminance level of a corresponding pixel at a maximum value of an intensity level of the arbitrary color component X by a luminance level of the corresponding pixel at a maximum value of an intensity level of RGBX.

5. The method of claim 2, further comprising:
  determining, after the obtaining an allowable luminance ratio, whether the allowable luminance ratio is less than the specified value and performing the obtaining a luminance enhancing ratio when determined that the allowable luminance level is less than the specified value; and
  bypassing the color signal, when determined that the allowable luminance ratio exceeds the specified value, without compensating for the luminance of the color signal.

6. The method of claim 1, wherein the obtaining an allowable luminance ratio includes deciding, as the allowable luminance ratio, a maximum value corresponding to the color signal among pre-stored maximum values capable of being represented in a multi-dimensional color space.

7. The method of claim 1, wherein the obtaining an allowable luminance ratio includes:
  obtaining a saturation value of the color signal; and
  deciding, as the allowable luminance ratio, a maximum value corresponding to the saturation value among pre-stored maximum values capable of being represented in a multi-dimensional color space.

8. The method of claim 7, wherein the obtaining the saturation value includes:
  obtaining a maximum value and a minimum value of intensity levels of channels of the color signal; and
  dividing the minimum value by the maximum value to yield the saturation value.

9. The method of claim 1, wherein the obtaining an allowable luminance ratio includes:
  obtaining a maximum value and a minimum value of intensity levels of channels of the color signal;
  subtracting the minimum value from the maximum value; and
  dividing the maximum value by the subtracted result to yield the allowable luminance ratio.

10. The method of claim 1, wherein the obtaining a luminance enhancing ratio obtains a luminance enhancing ratio corresponding to the allowable luminance ratio among stored luminance enhancing ratios.

11. The method of claim 2, wherein the obtaining a luminance enhancing ratio includes subtracting the allowable luminance ratio from the specified value to yield the luminance enhancing ratio.

12. The method of claim 2, wherein the obtaining a luminance enhancing ratio includes dividing the allowable luminance ratio by the specified value to yield the luminance enhancing ratio.

13. The method of claim 11, wherein a magnitude of the luminance enhancing ratio is changeable.

14. The method of clam 1, wherein the compensating includes:

subtracting an intensity level Xi of a channel or channels Pi of the color signal from a maximum intensity level of each channel Pi of the color signal;

dividing the subtracted result by the maximum intensity level;

multiplying the divided result by the luminance enhancing ratio and the intensity level Xi; and adding the multiplied result to the intensity level Xi to yield a luminance-compensated result of each channel Pi.

15. The method of claim 1, wherein the compensating includes:

dividing an intensity level Xi of a channel or channels Pi of the color signal by a maximum intensity level of each channel Pi of the color signal;

calculating the luminance enhancing ratio-th power of the divided result; and multiplying the maximum intensity level by the calculated result to yield a luminance-compensated result of each channel Pi.

16. The method of claim 1, wherein the compensating includes:

subtracting a maximum value of intensity levels of channels of the color signal from a maximum intensity level of each of a channel or channels Pi of the color signal;

dividing the subtracted result by the maximum intensity level;

multiplying the divided result by the luminance enhancing ratio and the maximum value; and adding the multiplied result to the maximum value to yield a luminance-compensated result of each channel Pi.

17. An apparatus for compensating for a luminance of a color signal, comprising:

an allowable luminance ratio calculator which calculates an allowable luminance ratio of a color signal, the luminance ratio being a ratio of a luminance according to saturation when the color signal is represented by four or more multiple primary colors, to a luminance according to saturation when the color signal is represented by three colors;

a luminance enhancing ratio calculator which calculates a luminance enhancing ratio of the color signal from the allowable luminance ratio; and a luminance compensator which compensates for a luminance of the color signal using the luminance enhancing ratio.

18. The apparatus of claim 17, wherein the luminance enhancing ratio calculator calculates the luminance enhancing ratio from the allowable luminance ratio and a specified value.

19. The apparatus of claim 18, further comprising:

a comparator which compares the allowable luminance ratio with the specified value and outputs the compared result; and a signal connector which outputs the color signal to the luminance compensator and bypasses the color signal to an external source, in response to the compared result.

20. The apparatus of claim 17, wherein the allowable luminance ratio calculator includes:

a first lookup table, in which are stored maximum values capable of being represented in a multi-dimensional color space, as data, and wherein the allowable luminance ratio calculator reads a corresponding maximum value in response to a color signal input as an address, and outputs the read value as the allowable luminance ratio.

21. The apparatus of claim 17, wherein the allowable luminance ratio calculator includes:

a saturation calculator which calculates a saturation value of the color signal; and a lookup table in which are stored, as data, maximum values capable of being represented in a multi-dimensional space, and wherein the allowable luminance ratio calculator reads a corresponding maximum value in response to a saturation value input as an address, and outputs the read value as the allowable luminance ratio.

22. The apparatus of claim 17, wherein the allowable luminance ratio calculator includes:

a maximum value extractor which extracts a maximum value of intensity levels of channels of the color signal;

a minimum value extractor which extracts a minimum value of intensity levels of channels of the color signal;

a first subtractor which subtracts the minimum value from the maximum value; and a first divider which divides the maximum value by the result subtracted by the first subtractor and outputs the divided result as the allowable luminance ratio.

23. The apparatus of claim 17, wherein the luminance enhancing ratio calculator includes:

a lookup table in which are stored the luminance enhancing ratios as data, and wherein the allowable luminance ratio calculator reads and outputs a corresponding luminance enhancing ratio in response to the allowable luminance ratio input as an address.

24. The apparatus of claim 18, wherein the luminance enhancing ratio calculator includes a subtractor, which subtracts the allowable luminance ratio from the specified value and outputs the subtracted result as the luminance enhancing ratio.

25. The apparatus of claim 18, wherein the luminance enhancing ratio calculator includes a divider, which divides the allowable luminance ratio by the specified value and outputs the divided result as the luminance enhancing ratio.

26. The apparatus of claim 24, wherein the luminance enhancing ratio calculator includes a first multiplier, which multiplies the result subtracted by the second subtractor by a first control constant and outputs the multiplied result as the luminance enhancing ratio.

27. The apparatus of claim 25, wherein the luminance enhancing ratio calculator includes a second multiplier, which multiplies the result divided by the divider by a constant and outputs the multiplied result as the luminance enhancing ratio.

28. The apparatus of claim 17, wherein the luminance compensator includes:

a subtractor which subtracts an intensity level Xi of a channel or channels Pi of the color signal from a maximum intensity level of each channel Pi of the color signal;

a divider which divides the result subtracted by the subtractor by the maximum intensity level;

a multiplier which multiplies the result divided by the divider by the luminance enhancing ratio and the intensity level Xi; and a first adder which adds the result multiplied by the multiplier with the intensity level Xi and outputs the added result as a luminance-compensated result of each channel Pi.

29. The apparatus of claim 17, wherein the luminance compensator includes:

a divider which divides an intensity level Xi of a channel or channels Pi of the color signal by a maximum intensity level of each channel Pi of the color signal;

an exponent part which calculates the luminance enhancing ratio-th power of the result divided by the divider; and a multiplier which multiplies the calculated result of the exponent part by the maximum intensity level and outputs the multiplied result as a luminance-compensated result of each channel Pi.

30. The apparatus of claim 17, wherein the luminance compensator includes:

a subtractor which subtracts a maximum value of intensity levels of channels of the color signal from a maximum intensity level of a channel or channels Pi of the color signal;

a divider which divides the result subtracted by the subtractor by the maximum intensity level;

a multiplier which multiplies the result divided by the divider by the luminance enhancing ratio and the maximum value; and an adder which adds the multiplied result with the maximum value and outputs the added result as a luminance-compensated result of each channel Pi.

* * * * *